United States Patent [19]

Inoue et al.

[11] Patent Number: 4,629,854

[45] Date of Patent: Dec. 16, 1986

[54] TW-ELECTROEROSION WITH MEANS FOR REGULATING FLUSHING LIQUID IN CUTTING SLOT

[75] Inventors: Kiyoshi Inoue, Tokyo; Akihiko Shimizu, Kanagawa, both of Japan

[73] Assignees: Inoue-Japax Research Incorporated; Japax Incorporated, both of Kanagawaken, Japan

[21] Appl. No.: 580,099

[22] Filed: Feb. 14, 1984

[30] Foreign Application Priority Data

Feb. 15, 1983 [JP] Japan .................................. 58-22185
Mar. 18, 1983 [JP] Japan .................................. 58-45806
Mar. 31, 1983 [JP] Japan .................................. 58-53983

[51] Int. Cl.[4] .......................... B23H 7/02; B23H 7/36
[52] U.S. Cl. .............................. 219/69 D; 204/129.5; 204/129.6; 204/206; 219/69 W
[58] Field of Search ............... 219/69 W, 69 M, 69 V, 219/69 D, 69 R, 68; 204/129.5, 129.6, 129.7, 206

[56] References Cited

U.S. PATENT DOCUMENTS

| | | | |
|---|---|---|---|
| 2,906,853 | 9/1959 | Sibley | 219/69 W |
| 3,035,150 | 5/1962 | Connoy | 219/69 W |
| 3,699,303 | 10/1972 | Kauffman et al. | 219/69 D |
| 4,121,080 | 10/1978 | Janicke | 219/69 W |
| 4,232,208 | 11/1980 | Buhler | 219/69 M |
| 4,263,493 | 4/1981 | Kilcher | 219/69 W |
| 4,314,133 | 2/1982 | Pfau et al. | 219/69 M |
| 4,333,806 | 6/1982 | Inoue | 204/129.5 |
| 4,479,045 | 10/1984 | Inoue | 219/69 M |
| 4,499,359 | 2/1985 | Obara | 219/69 M |
| 4,527,035 | 7/1985 | Majestic | 219/69 D |

FOREIGN PATENT DOCUMENTS

| | | | |
|---|---|---|---|
| 2143085 | 3/1972 | Fed. Rep. of Germany | 204/129.5 |
| 44-15885 | 7/1969 | Japan | 219/69 V |
| 114327 | 7/1982 | Japan | 219/69 M |
| 58-22629 | 2/1983 | Japan | 219/69 R |

Primary Examiner—A. D. Pellinen
Assistant Examiner—Geoffrey S. Evans
Attorney, Agent, or Firm—Karl F. Ross; Herbert Dubno

[57] ABSTRACT

To regulate the flushing liquid medium in the cutting zone of a TW electroerosion apparatus an elongate element is introduced into the cutting slot formed behind the advancing wire electrode and is maintained immediately behind the wire electrode and in parallel therewith, and thus dams the flushing medium in the space between the wire electrode and the element while serving to hold the wire electrode against deflecting rearwards. The elongate element is advantageously a tube having one or more apertures formed in a lateral wall thereof juxtaposed with the wire electrode, through which apertures the cutting liquid medium is discharged into the cutting zone and/or the flushing liquid medium in the cutting zone is sucked to assure an equalized distribution in the rate of flow in the cutting zone across the thickness of the workpiece. During a course of the cutting operation, the elongate element may be axially moved or reciprocated, or laterally oscillated.

40 Claims, 15 Drawing Figures

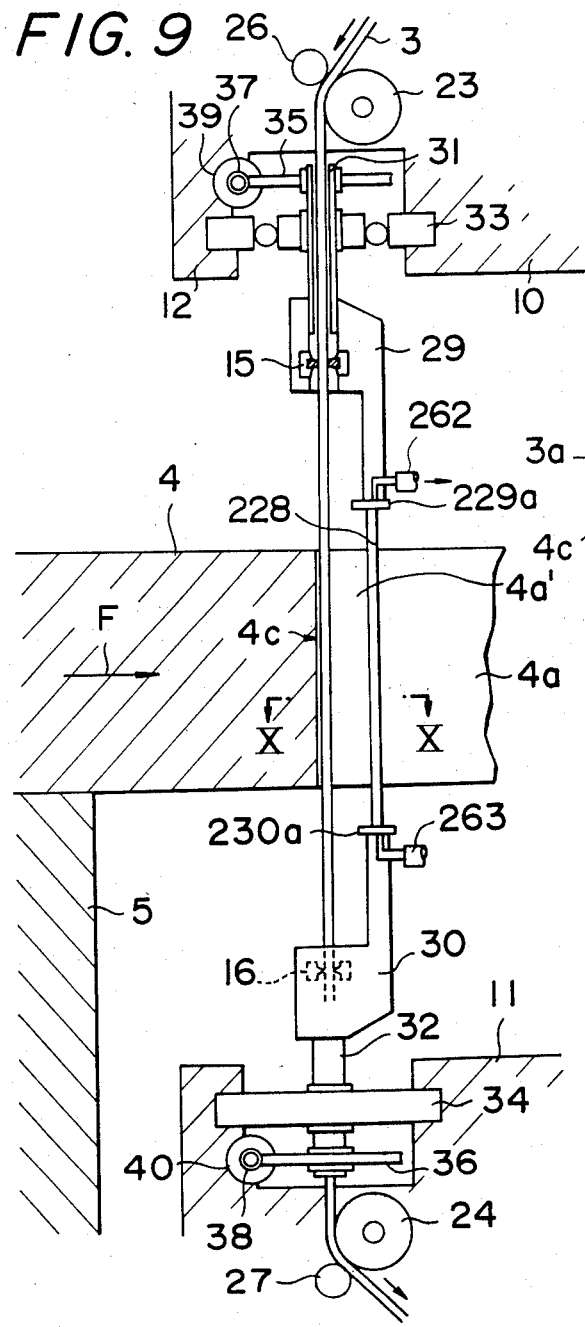
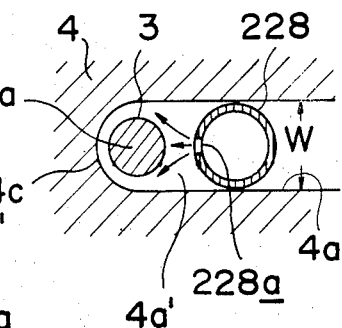

TW-ELECTROEROSION WITH MEANS FOR REGULATING FLUSHING LIQUID IN CUTTING SLOT

FIELD OF THE INVENTION

The present invention relates generally to traveling-wire (TW) electroerosion and, more particularly, to a new and improved method of and apparatus for electroerosively cutting an electrically conductive workpiece with an axially traveling wire electrode across a cutting gap flushed with a cutting liquid medium. The invention particularly relates to a method and apparatus of the type described, utilizing novel means for regulating the flushing liquid medium in the cutting zone to basically improve the performance of a traveling-wire electroerosion process.

BACKGROUND OF THE INVENTION

The process of traveling-wire electroerosion generally makes use of a continuous wire electrode composed of, say, brass or copper, and having a thickness ranging between 0.05 and 0.5 mm. The term "wire" is used in the art not only to refer to a wire which is circular, triangular, square or polygonal in cross section but also include a like elongate electrode which may be in the form of a tape or ribbon. The wire electrode is axially transported continuously along a given continuous guide path from a supply to a takeup through a cutting zone in which a workpiece is disposed. The cutting zone is commonly defined by a pair of cutting guide members which support the traveling wire across the workpiece. Wire traction and braking means allow the continuous wire to be tightly stretched and kept taut between the supply and the takeup and to be axially driven between the cutting guide members while traversing the workpiece, thus presenting the continuously renewed electrode surface juxtaposed in an electroerosive cutting relationship with the workpiece across a narrow cutting gap. The cutting gap is flushed with a cutting liquid medium and electrically energized with a high-density electrical machining current which is passed between the wire electrode and the workpiece to electroerosively remove material from the latter.

The cutting process may be performed in any of various electroerosive machining modes. In electrical discharge machining (EDM), the cutting liquid medium is a dielectric liquid and the machining electric current is supplied in the form of a succession of electrical pulses. In electrochemical machining (ECM), the cutting medium is a liquid electrolyte and the machining current is a high-amperage continuous or pulsed current. In electrochemical-discharge machining (ECDM), the liquid medium has both electrolytic and dielectric properties and the machining current preferably is applied in the form of pulses which facilitate the production of electrical discharges through the liquid medium.

The workpiece may be immersed in a bath of the cutting liquid medium which serves to flush the cutting zone. Conveniently, however, the cutting zone is typically disposed in the air or ambient environment. One or two nozzles of the conventional design disposed at one or both sides of the workpiece have been utilized to deliver the cutting liquid medium to the cutting gap. The cutting liquid is conveniently water which is deionized or ionized to a varying extent to serve as a desired electroerosive cutting medium. It has been recognized that the role of the cutting liquid medium in the electroerosive process is to carry the erosive machining current, to carry away the cutting chips and other gap products, and to cool the traveling, thin wire electrode and the workpiece.

To advance the electroerosive material removal in the workpiece, the latter is displaced relative to the wire electrode transversely to the axis thereof. This allows the traveling wire electrode to advance translationally in the workpiece and consequently a narrow cutting slot to be progressively formed behind the advancing wire electrode, the slot having a width slightly greater than the diameter of the wire electrode. The continuous relative displacement along a precision-programmed path results in the formation of a desired contour corresponding thereto and subtly defined by this cutting slot in the workpiece.

Higher cutting speed is an ever increasing demand in the process described. It is, of course, desirable that higher cutting speed be obtained without loss of cutting accuracy. The cutting speed, typically expressed in $mm^2/min$, is defined by the product of the workpiece thickness and the length of cut achieved per unit time along a given cutting course and hence is, for a given workpiece thickness, dependent upon the rate of translational advance of the wire electrode that can be increased. If the rate of advance happens to exceed an actual rate of material removal which not only preset cutting parameters that govern, inter alia, the cutting accuracy but variable prevailing cutting conditions allow, the fine wire breaks so that the cutting operation must be suspended. The goal of higher cutting speed is, therefore, dependent on how ideally optimum conditions in the cutting gap may be established and with stability maintained against instantaneous changes. Among other factors which govern these conditions, it will be noted that adequate flushing is of particular importance.

It is desirable that the cutting gap defined between the traveling, thin wire electrode and the workpiece be kept flushed with a sufficient volume of the cutting liquid and traversed thereby at a sufficient rate to allow the electroerosive action to continue with stability, the cutting chips and other gap products to be carried away promptly and the wire electrode subject to erosive heating to be cooled with effectiveness. Thus, the art has seen various improvements in the structure of fluid-delivery nozzles and the manner of supply the liquid medium into the cutting zone. It has been observed, however, that they are no more than practical and far less than ideal. At best, some of them are only satisfactory to substantially increase the cutting speed when the workpiece is relatively thin. The greater the workpiece thickness, the more difficult it is to maintain the same cutting speed as attainable for thinner workpieces.

OBJECTS OF THE INVENTION

Accordingly, the present invention seeks to provide an improved traveling-wire electroerosive cutting method which obviates the difficulties encountered in the prior art.

The present invention also seeks to provide an improved traveling-wire electroerosive cutting apparatus which is capable of cutting an electrically conductive workpiece at a speed higher than that attainable heretofore and with a cutting accuracy comparable to or even higher than that practical heretofore.

SUMMARY OF THE INVENTION

In accordance with the present invention there is provided, in a first aspect thereof, a method of electroerosively cutting an electrically conductive workpiece with a continuous wire electrode wherein the wire electrode is axially transported continuously to traverse the workpiece while defining a cutting zone therewith flushed with a liquid medium and an electric machining current is passed between the traveling wire electrode and the workpiece through the flushing liquid medium to electroerosively remove material from the workpiece across said cutting zone while the traveling wire electrode and the workpiece are relatively displaced transversely to the wire electrode along a prescribed cutting path, thereby progressively forming a cutting slot behind the advancing wire electrode along the cutting path in the workpiece to produce therein a contour defined by said slot, which method comprises regulating the flushing liquid medium in the cutting zone by introducing an elongate element into the slot in the cutting zone and maintaining the said elongate element immediately behind the advancing wire electrode and substantially in parallel therewith during a course of the relative displacement of the wire electrode and the workpiece along the said cutting path.

The invention also provides, in a second aspect thereof, as apparatus for electroerosively cutting an electrically conductive workpiece with a continuous wire electrode, having means for axially transporting the wire electrode continuously through the workpiece while defining a cutting zone therewith flushed with a liquid medium, power supply means for electrically energizing the traveling wire electrode and the workpiece to electroerosively remove material from the workpiece across the liquid flushed cutting zone and cutting feed means for relatively displacing the workpiece and the traveling wire electrode transversely to the latter along a prescribed cutting path, thereby progressively forming a cutting slot behind the wire electrode advancing along the cutting path in the workpiece to produce therein a contour defined by the cutting slot, which comprises: an elongate element adapted to be introduced into the cutting slot; and means for maintaining the elongate element in the slot immediately behind the advancing wire electrode and substantially in parallel therewith during a course of the relative displacement of the wire electrode and the workpiece along the said cutting path.

BRIEF DESCRIPTION OF THE DRAWING

These and other features of the present invention as well as advantages thereof will become more readily apparent from a reading of the following description when taken with reference to the accompanying drawing in which:

FIG. 9 is a diagrammatic elevational view illustrating another form of the present invention in which the elongate element is an apertured tube;

FIG. 10 is a diagrammatic cross-sectional view taken along the line X—X in FIG. 9;

SPECIFIC DESCRIPTION

Figure 1:
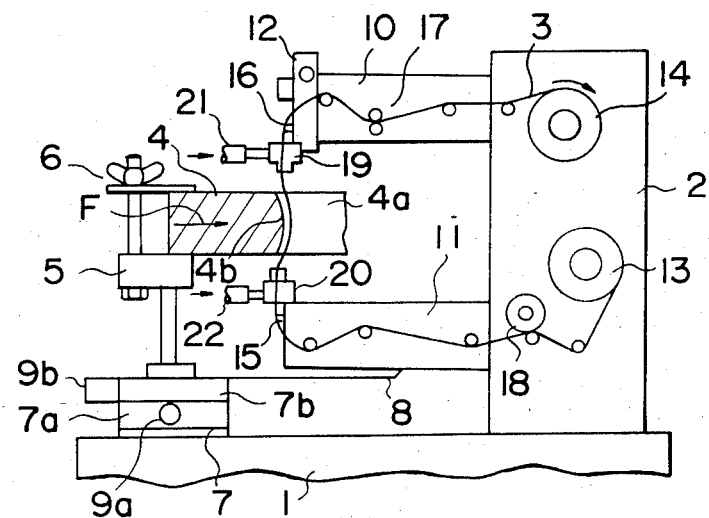
FIG. 1 is an elevational view, partly in section, diagrammatically illustrating a conventional traveling-wire electroerosion machine of standard design.

Referring to FIG. 1, a traveling-wire electroerosion machine has a frame comprising a base 1 and a column 2 standing upright thereon, and makes use of a continuous electrode wire 3 for cutting an electrically conductive workpiece 4. The workpiece 4 is shown as securely mounted on a stand 5 by means of a clamp 6, the stand being carried on a compound table 7 which supports a work pan 8. The table 7 is in turn carried on the base 1 and comprises a pair of drive tables 7a and 7b driven by a pair of motors 9a and 9b, respectively, and constructed in a conventional cross-slide arrangement.

The column 2 has a pair of arms 10 and 11 which extend horizontally therefrom parallel to each other. The upper arm 10 carries a head 12 at its end. The electrode wire 3 extends from a wire storage and supply reel 13 shown as mounted on the column 2 to a takeup reel 14 also shown as mounted on the column 2 via a number of guide rolls or guide members supported on the column 2 and the arms 10 and 11 as shown. These guide members include a pair of wire guides 15, 16, one of which is shown at 16 as mounted on the head 12 and the other of which is shown at 15 as mounted on an end of the lower arm 11, for establishing a straight line path along which the electrode wire to travel in an electroerosive cutting relationship with the workpiece 4. Each of the wire guides 15, 16 may be in the form of scaphoid as shown, or a pin, die or roll. The electrode wire 3 is axially driven by a traction drive 17 shown as mounted on the upper arm with a braking element 18 shown as mounted on the column 2 exerting sufficient tension on the wire to maintain the tightness and linearity of it while it travels between the wire guides 15 and 16.

At the opposite sides of the workpiece 4 there are shown fluid delivery nozzle assemblies 19 and 20 and one or both of these nozzle assemblies, connected with a source (not shown) of a cutting liquid medium via fluid inlets 21 and 22, respectively, may be utilized.

Here, the upper nozzle assembly 19 is shown as supported on the head 12 and the lower nozzle assembly 20 on an end portion of the lower arm 11. Each of the nozzle assemblies 19 and 20 has a nozzle opening juxtaposed with the workpiece 4 to supply a stream of the liquid medium into the cutting gap defined between the traveling wire 3 and the workpiece 4. An electroerosion power supply (not shown) is electrically connected with the electrode wire 3 and the workpiece 4 to pass an electrical machining current therebetween across the cutting gap flushed with the liquid medium to electroerosively remove material from the workpiece 4. To advance the material removal along a predetermined cutting path, a programmed drive control system (e.g. an NC unit) not shown operates to energize the motors 9a, 9b to drive the compound drive table 7, thus displacing the workpiece 4 along the programmed path in a horizontal plane, and effectively the traveling wire 3 translationally along that path in the workpiece 4. As shown, the workpiece 4 is being displaced in the direction of arrow F, i.e. left to right, so that the electrode wire 3 is effectively advancing from right to left in the workpiece 4, forming therein a cutting slot 4a which has a width slightly greater than the diameter of the electrode wire 3.

Figures 2, 3:
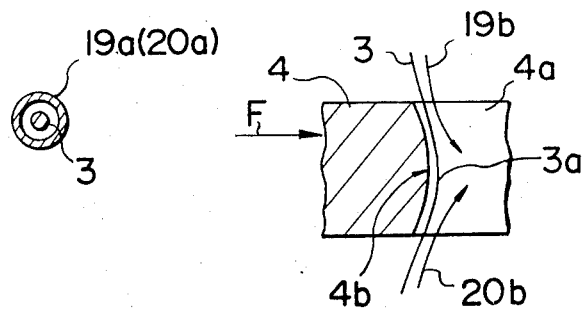
FIG. 2 is a plan view diagrammatically illustrating a nozzle opening and an electrode wire as viewed from the workpiece side in the arrangement of FIG. 1.
FIG. 3 is an enlarged diagrammatic sectional view of a cutting region in the workpiece shown in FIG. 1.

As shown in FIG. 2, the nozzle opening 19a, 20a of each nozzle assembly 19, 20 is advantageously constructed and arranged to be coaxial with the electrode wire 3 traveling between the cutting guide members 15 and 16 and thus through the cutting zone. With such a coaxial nozzle design, a cylindrical stream of the cutting liquid medium coaxially surrounding the electrode wire is produced and allowed to enter the cutting zone with greater smoothness. By providing such nozzle assemblies at both sides of the workpiece, the coaxial flushing effect is further intensified. While the coaxial fluid flows were thus found desirable to generally improve the flushing conditions in the cutting zone, it has now been found that the conventional arrangements designed to establish these flows are still defective to allow a substantial rise in the cutting speed especially when the workpiece is relatively thick. As shown in FIG. 3, the flushing liquid streams 19b, 20b entering into the cutting zone tend to divert into the cutting slot 4a. Thus, apparently because of this, the phenomenon is observed that erosion of the workpiece in the cutting gap tends to concentrate towards the upper and lower surface regions thereof, in which the cutting liquid is greater in both amount and volume flow adjacent the electrode wire surface in the cutting gap, leaving a zone of slower material removal midway between these regions. As a result, the cutting front in the workpiece 4 becomes, as shown at 4b, convexed towards the cutting slot 4a and, due to the machining pressure developing in the cutting gap, the electrode wire 3 becomes, as shown at 3a, bent conforming to the convexed cutting front 4b, as shown in both FIGS. 1 and 3. Once this happens, the flushing liquid flows entering into the cutting zone will more and more diverge while upon colliding at the mid area will create a region of substantial turbulence which further promotes the divergence, the convexing and the wire bending. The chips, gases and other machining products tend to accumulate in that area and cooling of the electrode wire 3 in the cutting zone becomes insufficient. The wire 3 will eventually come into short circuit with the cutting front 4b and break. Thus, it will be apparent that not only does this phenomenon substantially impair the cutting accuracy but it is the very limiting factor for attempts to rise the cutting speed. Hitherto, the effective advance or cutting feed of the electrode wire has had to be set at a sufficient low rate such as to allow the two extreme regions of the cutting front not to erode quicker than its mid region in the cutting zone.

The problems of the conventional electroerosion system as described are overcome according to the principles of the present invention which will be described hereinafter with reference to several embodiments thereof.

Figure 4:
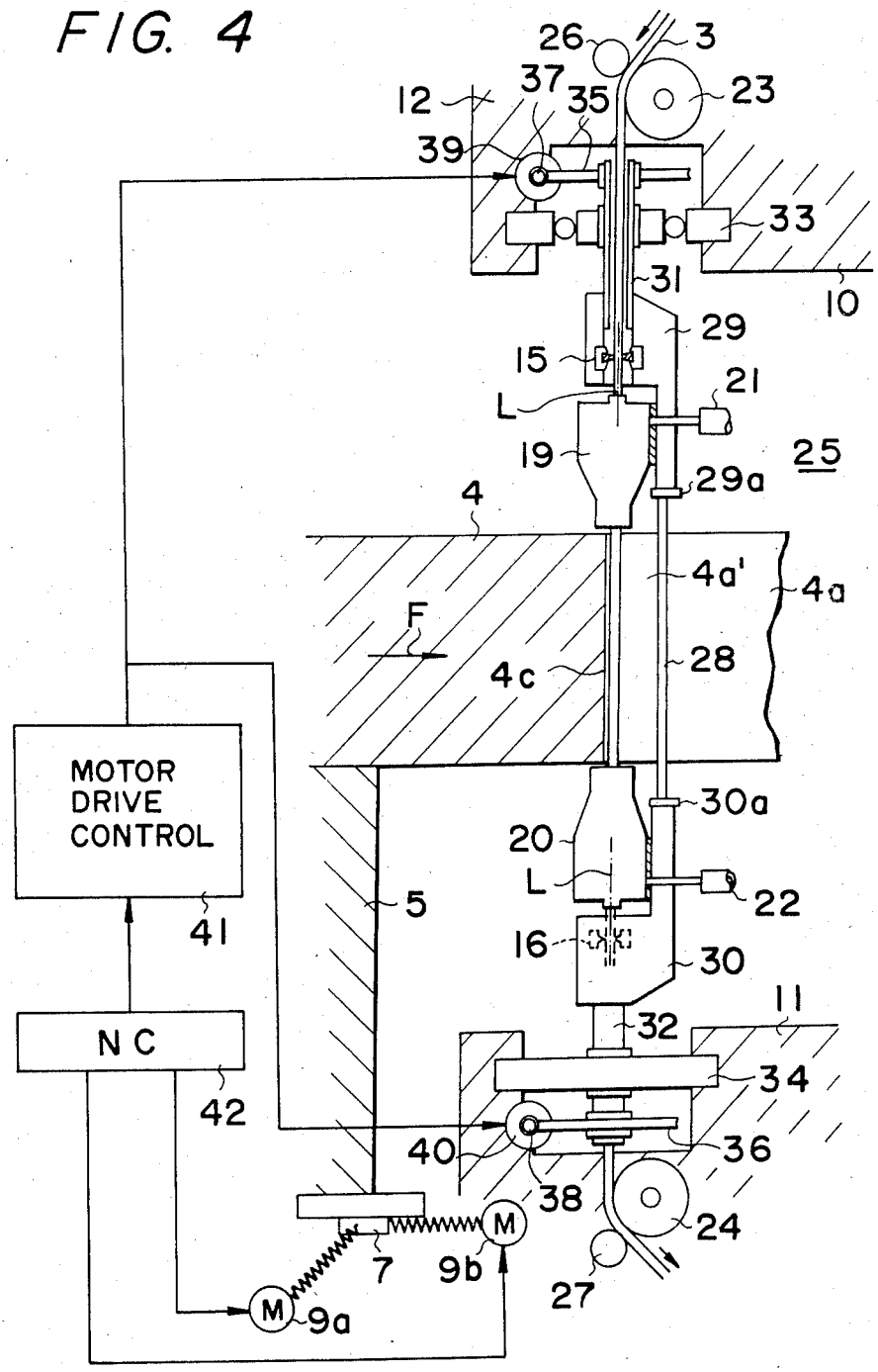
FIG. 4 is an elevational view, partly in section, diagrammatically illustrating a traveling-wire electroerosion cutting system incorporating the principles of the present invention.

Referring first to FIG. 4, there is shown a TW EDM (electrical discharge machining) system incorporating the principles of the present invention. The workpiece 4 securely mounted on the compound worktable 7 is thereby displaceable in a horizontal or X-Y plane transverse to the electrode wire 3 which extends vertically, here, from up to down between guide rollers 23 and 24. The electrode wire 3 is dispensed over the upper guide roller 23 from supply means (not shown), transported axially downwards and guided over the lower guide roller 24 onto takeup means (not shown here). By means of a traction drive and braking drive (both not shown here) provided in the wire takeup and supply sides, respectively, the electrode wire 3 is caused to continuously travel at a suitable rate of axial travel under a suitable tension in a cutting zone adjacent the workpiece 4 (a cutting front 4c).

Across the cutting zone, there is provided a pair of wire-positioning guide members 15 and 16 for establishing therebetween a straight-line path L for the electrode wire 3 so that the wire 3 may travel precisely in alignment with this established path in electroerosive cutting relationship with the workpiece 4. Such wire-positioning guide members may be provided fixed in position on the erosion machine, e.g. on the arms 10, 11 as in the arrangement shown in FIG. 1. In the arrangement of FIG. 4, these guide members 15, 16 are carried on a rotary mechanism 25 as will be described. The guide members 15, 16 may be constructed each to form an aperture for passage by the electrode wire 3 are preferably composed of or lined with an electrically nonconductive and friction-resistant material such as ruby, saphire, diamond or ceramic for bearing contact with the electrode wire 3.

The cutting liquid medium, e.g. deionized water, for flushing the cutting zone may be supplied from one or more nozzles as shown in FIG. 1. Two such nozzles 19, 20 are here again shown as disposed, respectively, immediately above and below the cutting zone in the workpiece 4 to project the cutting liquid streams coaxially surrounding the electrode wire 3 into the cutting zone. These coaxial nozzles 19 and 20 are also shown carried on the rotary mechanism 25 to be described, but may not be so carried but may be fixedly supported by the head 12 and the lower arm 11, respectively. The nozzles 19 and 20 are fed with the cutting liquid medium at the inlet conduits 21 and 22, respectively.

Disposed in bearing contact with the electrode wire 3 adjacent the upper and lower guide rollers are electrically conductive pins or rollers 26 and 27 which are electrically connected with one terminal of an EDM power supply (not shown) to energize the electrode wire 3. The workpiece 4 is electrically connected to the other terminal of the EDM power supply via a conductor (not shown). The EDM power supply is adapted to apply a succession of voltage pulses between the electrode wire 3 and the workpiece 4 to produce successive electrical discharges across a cutting gap formed therebetween in the cutting zone and flushed with the liquid medium. The electrical discharges are consecutively produced to electroerosively remove material from the workpiece 4 while the latter is displaced transversely to the electrode wire 3 traveling between the wire-positioning elements 15 and 16 typically under commands of an NC (numerical control) unit 42 so that the axis of the electrode wire 3 moves along a prescribed path in the workpiece 4, forming the cutting slot 4a behind the moving electrode wires 3 to eventually generate a desired contour defined by the cutting slot 4a in the workpiece 4 along that path.

In accordance with the principles of the present invention, a solid, elongate element 28 having a thickness slightly less than the width of the cutting slot 4a or substantially equal to the thickness of the electrode wire 3 is disposed immediately behind the moving electrode wire 3 in the cutting slot 4a and positioned substantially parallel to the electrode wire 3 to regulate a stream or streams of the cutting liquid medium flushed into the cutting zone from one or both of the nozzles 19 and 20, as will be described. In case the electrode wire 3 advancing in the workpiece 4 changes its course along the prescribed cutting path, it is necessary that the element 28, to avoid collision with the cutting slot 4a and to lie immediately behind the advancing wire 3, be mounted rotatably about the axis of the wire 3 or the straight-line path L established between the wire-positioning guide members 15 and 16 for the wire axis.

Accordingly, in the arrangement illustrated in FIG. 4, the element 28 extending over the thickness of the workpiece 4 has its two ends securely supported by upper and lower support members 29 and 30 at their mounting ends 29a and 30a, respectively. The support members 29 and 30 which carry the wirepositioning guide members 15 and 16, respectively, have tubular cylinder portions 31 and 32 secured respectively thereto which are in turn journaled to the head 12 and the lower arm 11 via radial bearings 33 and 34, respectively. The upper arm 10 which carries the head 12 and the lower arm 11 may here be horizontally extending parallel arms projecting from the column 2 which stands upright on the machine base 1 as shown in FIG. 1. The upper cylinder 31, the upper support member 29, the lower support member 30 and the lower cylinder 32 are coaxially bored to accommodate the path of the electrode wire 3 between the upper and lower guide rollers 23, 24 and to allow the electrode wire 3 to freely move therethrough past the upper nozzle chamber 19, the cutting zone and the lower nozzle chamber 20. The upper and lower wire-positioning guide members 15 and 16 are securely arranged respectively within the bores of the upper and lower support members 29 and 30 while the upper and lower nozzle chambers 19 and 20 are securely carried on the arms of the upper and lower support members 29 and 30, respectively. The upper and lower cylinders 31, 32 which are supported to be rotatable about the axis of rotation precisely coinciding with the straight-line path L have respective worm wheels 35, 36 secured thereto which are in mesh with worm shafts 37, 38 driven by motors 39 and 40, respectively.

The motors 39, 40 are driven synchronously through the same angle, thus rotating the assembly 25 through a given angle of rotation. A motor-drive control circuit 41 for the motors 39, 40 is fed with a control signal furnished from the numerical controller 42 previously mentioned to orient the support members 29, 30 and hence the element 28 angularly about the wire axis or straight-line path L. The rotation of the support members 29, 30 causes the wire guides 15, 16 to rotate about the rotary axis of the element 28 which is set to coincide with the straight-line path L so that there may result no deviation of the position of the wire axis in the cutting zone from the prescribed cutting path.

The flow regulating element 28 in the illustrated embodiment serves to prevent the cutting liquid medium introduced from one or both of the nozzles 19, 20 into the cutting zone from diverting far into the cutting slot 4a and to dam the flushing liquid medium substantially within the space defined by the cutting front 4c and portion 4a' of the cutting slot immediately adjacent the electrode wire 3. Thus, the cutting liquid introduced into the workpiece 4 is effectively retained substantially within the cutting zone by the element 28 and thereby allowed to flow evenly therethrough, thus permitting a substantial rise in the machining current and full cooling of the traveling electrode wire 3. Moreover, the cutting liquid retained by the element 25 within the space 4a' serves as a pressure cushion for the wire 3 to hold it against deflecting rearwards. The element 28, to serve as a dam or barrier for the cutting liquid medium and also as a back-up member for the electrode wire 3, may be in the form of a cylindrical rod or tubular cylinder which is circular in cross section or elongated in cross section in the direction of advance of the electrode wire or in the direction perpendicular to the width of the cutting slot 4a, 4a'. The element should have a uniform thickness or a thickness in the direction of the width of the cutting slot, substantially equal to and slightly less or greater than the thickness of the electrode wire 3, thus slightly less than the width of the cutting slot 4a, 4a' (e.g. around 0.27 mm when the wire diameter is 0.2 mm). A wire or thin pipe having such a thickness or diameter and composed of a stainless steel, copper, copper alloy, titanium, titanium alloy, or other metal or alloy is found suitable for the element 25. The metallic and thus electrically conductive wire or pipe should be coated with an electrically insulating material such as a plastic, or polymeric film to establish an electrical insulation with the electrode wire 3 and the workpiece. A plastic rod or pipe of the required thickness is also suitable for the element 28. An element 28 with bristles or small projections on its peripheral surface is also found suitable. It has also been found to be desirable that the distance between the electrode wire 3 and the element 28 be set and maintained at a value ranging between twice and five times as great as the thickness (diameter) of the electrode wire 3.

Figure 5:
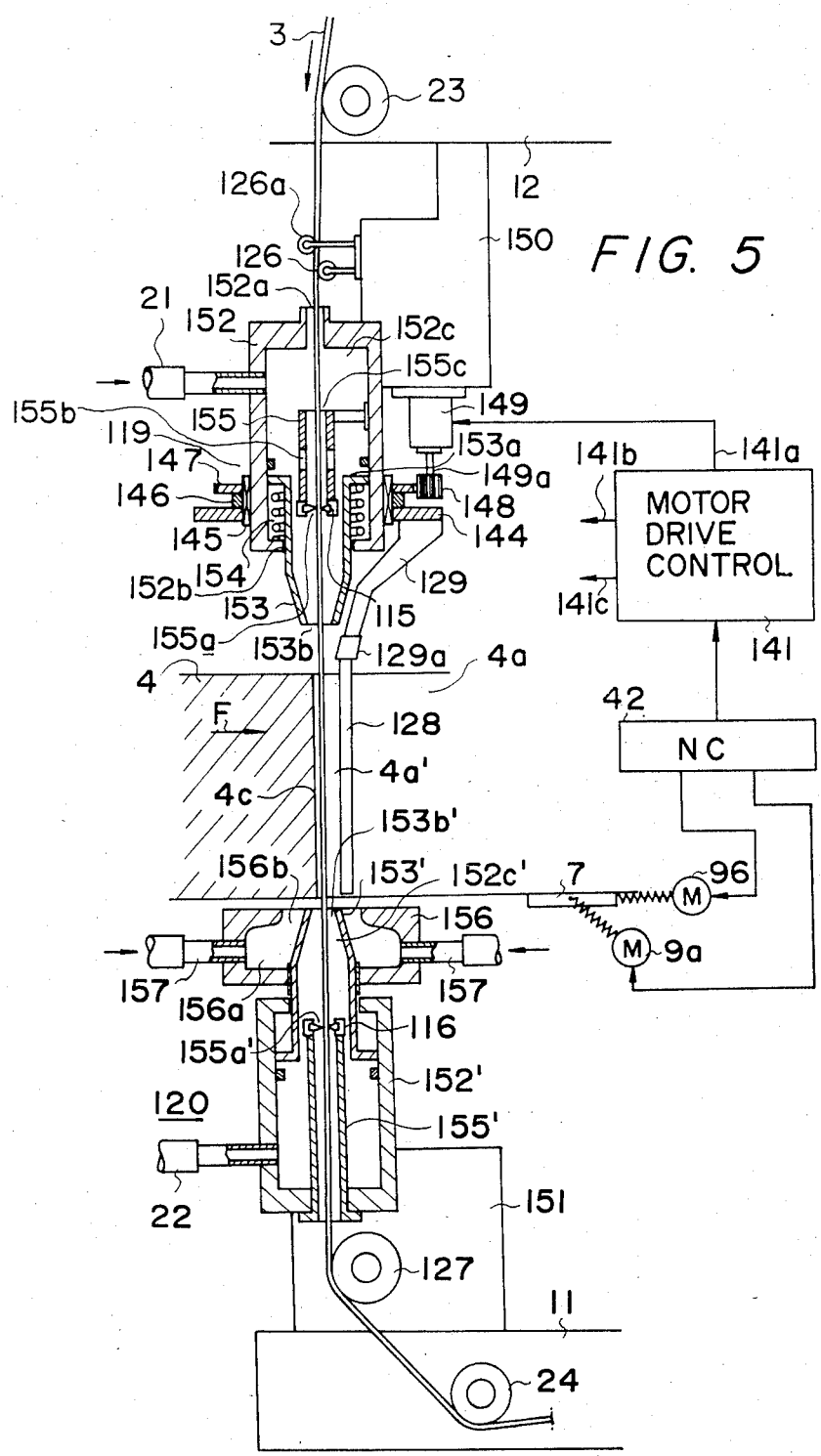
FIG. 5 is a similar view diagrammatically illustrating a modification of the system of FIG. 4.

In a modified embodiment of the invention shown in FIG. 5, a flow regulating element 128 has its one end, lower as shown, free and only its other end, upper as shown, supported by a support member 129 via with a mounting element 129a which is in turn carried by a disk 144 mounted rotatably on an upper nozzle assembly 119 via a bearing 145. The disk 144 is secured by a ring 146 to a toothed wheel 147 which is in mesh with a gear 148 which is secured on an output shaft 149a of a motor 149. The motor 149 is dependently secured to a supporting block 150 which depends from the machine head 12 which carries the upper nozzle assembly 119. The head 12 also carries a pin conductor 126 in contact with the electrode wire 3 advancing from the wire supply (not shown) over the guide roll 23 for electrically energizing the same and a pin pusher 126a for holding the conductor 126 in bearing contact with the electrode wire 3 while advancing into the nozzle assembly 119. The pin conductor 126, thus disposed immediately above the nozzle assembly 119, is electrically connected to a first terminal of the EDM power supply (not shown) whose second terminal is electrically connected to the workpiece 4. Another conductor 127 in the form of a roll is mounted on a mounting block 151 securely carried on the lower arm 11 of the machine and is provided to electrically energize the electrode wire 3 traveling from the workpiece 4 or the cutting zone past a lower nozzle assembly 120 which is carried on the mounting block 151.

The nozzle assemblies 119 and 120 are shown as having an improved construction. The upper nozzle assembly 119 comprises a cylindrical housing 152 and a nozzle member 153 coaxially and slidably received therein. The housing 152 has an upper small opening 152a through which the electrode wire 3 is passed and a lower, larger opening 152b through which the nozzle member 153 projects. The nozzle member 153 has at upper end a flange 153a seated on a spring 154 which serves to resiliently support the nozzle member 153 with respect to the housing 152. Disposed within the cylindrical housing 152 coaxially therewith and with the nozzle member 153 is a tubular member 155 having at its lower end a wire guide opening 155a, here defined by a circular die guide 115, for guiding the electrode wire 3 to move therethrough coaxially with the floating nozzle member 153. The tubular member 155 is fixed in position coaxially within a fluid passage 152c defined by the cylindrical housing 152 and the floating nozzle member 153. The fluid passage or chamber 152c is supplied with the cutting liquid medium through the inlet 21 communicating a source thereof (not shown). The cutting liquid medium supplied is allowed to flow through an annular passage defined between the nozzle member 153 and the tubular member 155 and is discharged through a nozzle opening 153 coaxially with the traveling electrode wire 3 into the cutting zone. The tubular member 155 is formed with a plurality of equidistantly spaced bores 155b which constitute an exit passage for the liquid medium which enters into the tubular member 155 through its upper opening 155c. When the chamber 152c is loaded with the cutting liquid medium from the source to discharge it through the nozzle opening 153b, the floating nozzle member 153 is, under the fluid pressure within the chamber 152c, moved forward with respect to the cylindrical housing 152 against the pressure of the spring 154 tending to move it upwards. The nozzle assembly 119 is then moved downwards with the mounting block 150 to bring the nozzle opening 153b closer to the workpiece 4. The floating nozzle member 153 tends to move back under the pressure of the fluid discharged from the nozzle opening 153b into the cutting zone. Thus, the floating nozzle assembly 119 can be moved downwards until the nozzle opening 153b comes to very close to the workpiece 4 when the pressure forcing the floating nozzle member 153 downwards and the pressure forcing it upwards with respect to the supporting housing 152 are balanced. Accordingly, the fluid pressure within the cutting zone can be maintained substantially constant. A portion of the cutting liquid medium introduced under pressure into the fluid passage 152c is allowed to flow out through the upper opening 152a of the cylindrical housing 152 to flood onto the pin conductor 126 to cool it at the electrode wire 3 electrically energized thereby.

Figure 6:
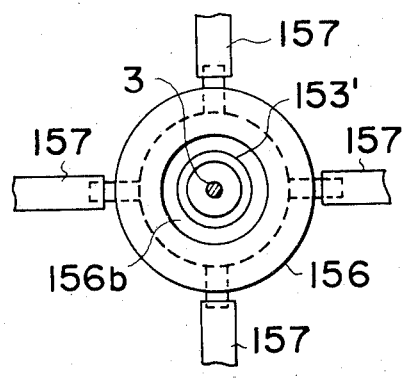
FIG. 6 is a diagrammatic plan view of one fluid delivery nozzle unit shown in FIG. 5 and as viewed from the workpiece side.
Figure 7:
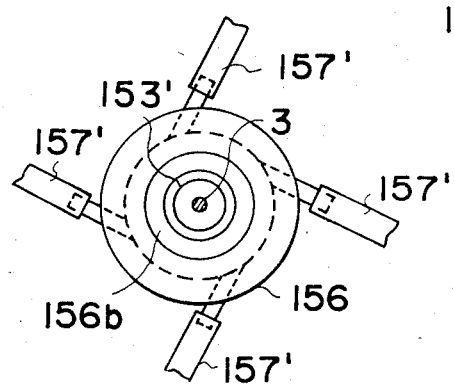
FIG. 7 is a diagrammatic plan view illustrating a modification of the fluid delivery nozzle unit of FIG. 6.

The lower nozzle assembly 120 fed through the inlet 22 with the cutting liquid medium may be essentially the same in design as the upper nozzle assembly 119 described. In the assembly 120 shown, however, a floating nozzle member 153' slidably retained with a cylindrical housing 152' coaxially with an inner tubular member 155 is arranged in an auxiliary nozzle 156 coaxially therewith, having a chamber 156a therein communicating with a fluid source via a plurality of inlets 157. The auxiliary nozzle 156 has an annular nozzle opening 156b coaxially surrounding the nozzle opening 153b' of the floating nozzle 153' and is secured to the latter so that the nozzle opening 156b is substantially flush with the nozzle opening 153b'. In this arrangement, the chamber 152c' in the main nozzle 153' is fed with the cutting liquid medium under a relatively high pressure to direct into the cutting zone a high-velocity columnar stream of the cutting liquid medium coaxial with the electrode wire 3. The chamber 156a in the auxiliary nozzle is fed with the cutting liquid medium under a relatively low pressure to direct to the workpiece a low-velocity columnar stream of the cutting liquid medium so as to surround the high-velocity columnar stream and thereby to form a protective curtain about the high-velocity columnar stream and a pressure cushion to force the latter substantially in its entirety to pass into the cutting slot and the cutting zone without breakup or divergence. As shown in FIG. 6, the fluid inlets 157 into the auxiliary nozzle chamber 156a may be oriented perpendicular to the cross-section of the main nozzle body 153'. To intensify the high-velocity stream flowing from the main nozzle 153' coaxially with the electrode wire 3, a modification of the auxiliary nozzle shown in FIG. 7 has four fluid inlets 157' oriented tangentially to such a circular cross-section to create in the chamber 156a a swirling flow which is projected coaxially with the electrode wire 3 to provide an enhanced protective curtain and pressure cushion for the main, high-velocity cutting liquid stream.

The flow regulating element 128 is, as shown, placed in the cutting slot 4a to lie across the thickness of the workpiece 4 and thus to locate its lower end substantially at the same level at the lower surface of the workpiece 4. The angular position of the element about the axis of the electrode wire 3 is controlled by the motor 149 which is driven to rotate the disk 144 that carries the support member 129, in response to control signals furnished from a control circuit 141 via an output 141a, so that in spite of a change in the course of the electrode wire 3, the axis of the element 128 may always lie on the trajectory of the axis of the electrode wire 3. The motor control circuit 141 is here again designed to process wire-path data from the NC unit 42 to produce an angle signal when a change has occurred in the course of the electrode wire 3 or instantaneously while the wire 3 is moving along a curve.

The NC unit 42 includes, as per the conventional design, x-axis and y-axis pulse distributors to provide drive pulses distributed into the x-axis motor 9a and the y-axis motor 9b so that the axis of the electrode wire 3 may effectively move along a programmed path in the workpiece 4. In other words, each control signal from the x-axis distributor represents a commanded displacement along the x-axis and each control signal from the y-axis distributor represents a command displacement along the y-axis, and these componental displacements make up a commanded contouring path. The control circuit 141 derives from these signals an angle-sensing signal which represents an angle of the tangent to the contouring path at each preset point thereon with respect to a predetermined coordinate axis (e.g. x-axis), and from this signal, produces an angle drive signal. Assuming the angle at an n-th point pn to be $\theta n$, $\theta n$ is given as equal to $\tan^{-1}$ (Yn/Xn) where Xn is a commanded displacement along the x-axis and Yn is a commanded displacement along the y-axis, both per unit time from the point Pn. The control circuit 141 may include a first and a second register (control) for cutting signal pulses, representing an x-axis displacement Xn and a y-axis displacement Yn, from the x-axis and the y-axis distributor, respectively, each per unit time, and a divider responsive to the first and second registors for producing a value Yn/Xn. The output of the divider may then have a computer for calculating $\tan^{-1}$ (Yn/Xn) and thus obtaining $\theta n$. The value $\theta n$ is compared with a value $\theta n-1$ calculated for a preceding given point Pn−1 and the difference $\theta n - \theta n - 1$ is calculated to provide an angle drive signal.

Figure 8:
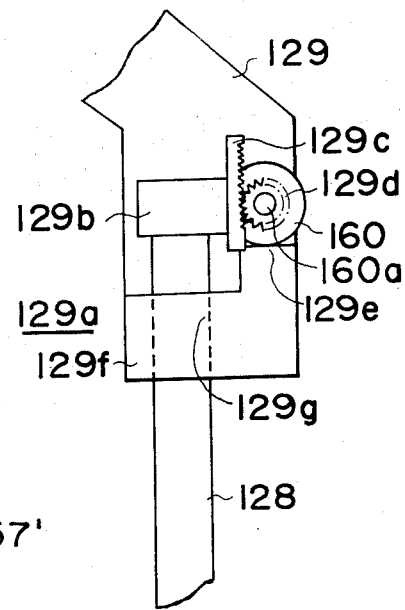
FIG. 8 is an elevational view diagrammatically illustrating a carriage for the elongate element in the system of FIG. 5.

The flow regulating element 128 is also carried on the support member 129 at the mounting portion 129a so that its vertical position may be variably adjusted for or may be varied during, a given cutting operation. As shown in FIG. 8, the upper end of the element 128 is, in the mounting portion 129a, detachably supported by a header 129b which is secured to a vertical toothed plate 129c in mesh with a gear 129d. The gear 129d is securely fitted on the output shaft 160a of a motor 160 and the latter is secured in position on a shoulder 129e of a block 129f having a bore 129g through which the element 128 is slidably guided. The motor 160 is energized by a drive signal issued from the control circuit 141 via an output 141b to adjust the vertical position of the element 128.

Also, the allow the distance between the flow regulating element 128 and the electrode wire 3 in the cutting slot 4a, the support member 129 may be adjustably movable relative to the disk carriage 144 in a radial direction thereof. A motor (not shown) may be mounted on one of the disk carriage 144 and the support member 129 to so move the latter via a geared coupled in response to a drive signal which may be issued from the control circuit 141 via an output 141c.

In a further modification of the arrangement shown, the motor 160 may be rotated reciprocatingly to reciprocate the flow regulating element 128 axially thereof. By axially reciprocating the element 128 with a suitable stroke and in an appropriate period, it has been found that a highly stabilized cutting condition can be established. The stroke of the reciprocation may be set by adjusting the angle of reciprocatory rotation of the motor 160 for a given diameter of the gear 129d and the period or frequency of the reciprocation may be set by adjusting the rate of rotation of the motor 160. In a further modification, the element 128 may also be laterally oscillated to enhance its flow regulating function. To this end, an ultrasonic horn may be placed in contact with the element 128 and energized by a power supply to impart high-frequency mechanical vibrations to the elongate element 128.

FIG. 9 shows another form of the EDM system embodying the present invention in which the flow regulating element is constituted by a perforated thin tube 228 (FIG. 10) supported between a pair of support member 29 and 30, as previously described, to extend parallel to and immediately behind the electrode wire 3 in the cutting slot 4a of the workpiece 4 across the thickness thereof. In the arrangement of FIG. 10, both an upper and a lower nozzle assembly as previously described are omitted and it may be assumed that the workpiece 4 including the cutting slot 4a, 4a' is immersed in a bath of the cutting liquid medium. The thin, elongate tubular element 228 having one or more openings 228a (FIG. 10) juxtaposed with the electrode wire 3 across the spacing 4a' in the cutting slot 4a is here designed to serve as a fluid delivery or suction and, to this end, is, at its upper and lower ends, connected via fluid inlets 261 and 262 with a source (not shown) of the pressurized cutting liquid medium or suction. The element 228 at these ends are fastened tightly to the support members 29 and 30 by means of couplings 29a and 30a, respectively. As previously mentioned, the element 228 has a thickness slightly less than the width w of the cutting slot 4a.

Figure 11:
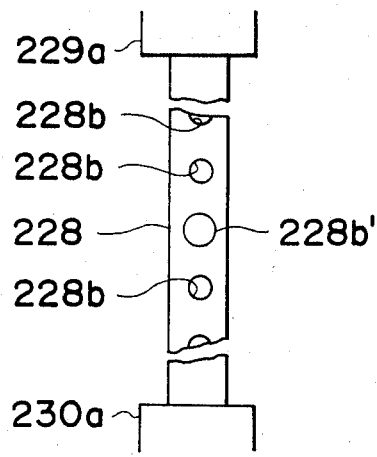
FIG. 11 is an elevational view diagrammatically illustrating an embodiment of the tubular elongate element shown in FIG. 9.
Figure 12:
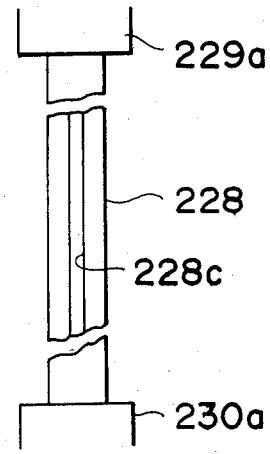
FIG. 12 is a similar view of another embodiment of the tubular elongate element.

FIG. 11 shows an embodiment of the tubular element 228 which has an array of apertures 228b formed at given position evenly spaced apart longitudinally in the wall thereof and juxtaposed with the electrode wire 3. The apertures 228b may be evenly spaced apart and of equal size to assure an equal flow of the cutting liquid medium through each aperture into the space 4a' from the tube 228, or vice versa. Preferably, however, an aperture or apertures 228b' located amid the array should be greater in size than the others as shown so that the amount of cutting liquid medium flowing into or out of the space 4a, or out of or into the tube 228 is the greatest in a region which is the most distant from the upper and lower surface of the workpiece 4. FIG. 12 shows another embodiment of the tubular element 228 which has a slit or aperture 228c elongate in the longitudinal direction thereof. The aperture 228c may be even in width throughout its length as shown but, here again, should preferably be wider in the mid zone. In any possible embodiment of the apertured tubular element 228, it is desirable that there be produced in the space 4a' a substantial equalized distribution in the rate of flow of the cutting liquid medium and an optimized distribution in the fluid pressure to hold the wire 3 against deflection backward, and hence to assure linearity of it while traveling through the cutting zone and consequently of the cutting front 4c.

Figure 13:
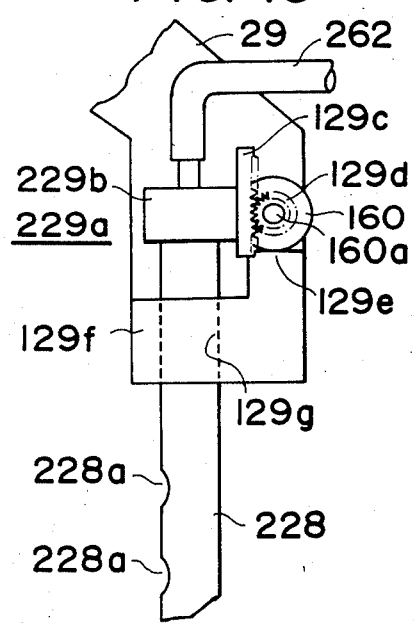
FIG. 13 is a diagrammatic elevational view illustrating a carriage for the tubular elongate element, having a fluid conduit connected thereto.

FIG. 13 shows an embodiment of the coupling 229a connecting the tubular element 228 to the support member 29. The coupling 229a show here is basically the same as the coupling 129a shown in FIG. 8 except that a header 229b has an internal passage which communicates the tube 228 having the apertures 228a with the fluid inlet 262. The coupling 229a, as is the coupling 129a, is used to hold one end of the element whose other end is free, thus rendering the lower support member 30 and the coupling 230a in the arrangement of FIG. 9 unnecessary.

Figure 14:
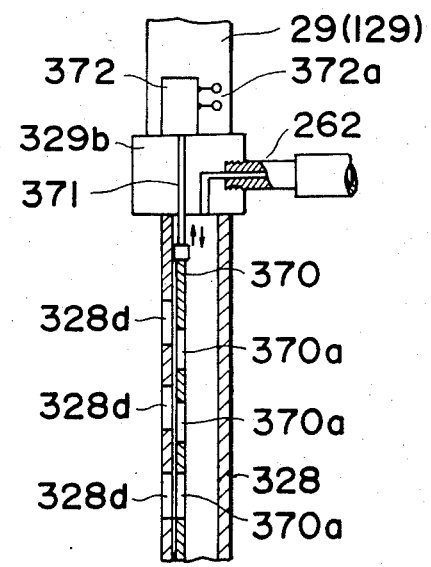
FIG. 14 is a longitudinal sectional view diagrammatically illustrating a modification of the flow regulating system shown in FIG. 9.

In FIG. 14 there is shown a flow regulating assembly further embodying the present invention. The assembly shown comprises a tubular element 328 having a plurality of apertures 328d longitudinally equi-distantly spaced apart formed in the wall thereof. The tubular element 328 is supported by a header 329b having an internal passage, which communicates the fluid inlet 262 with the bore in the tubular element. The header 329b may be connected to the support member 29 in FIG. 9 or the support member 129 in FIG. 5 securely or, alternatively, movably in the vertical direction via a drive unit as shown in FIG. 8 or 13 to vertically move or reciprocate, or adjust the vertical position of, the tubular element 328 in the cutting slot 4a of the workpiece 4. Means for laterally oscillating the tubular elongate element 328 may also be provided. Disposed within the tubular element 328 and juxtaposed with a position of the wall thereof in which the apertures 328d are formed is an elongate valve element 370 having a plurality of valve openings 370a formed longitudinally thereof. The valve element 370 is carried by a shaft 371 passing through the header 329b and connected to an electric actuator 372. The actuator 372 is energized through its input terminal to change the vertical position of the valve element 370 with respect to the tubular member 328, thereby changing the openings of the apertures 328d of the tubular member 328. The valving apertures 370a of the valve member 370 are arranged, for example, such that when the member 370 is at a given position, as shown the aperture located amid the array is fully open and the openings of the apertures are more reduced as their positions are more distant from that central aperture. As the valve member 370 is moved up and down by the actuator 372, these apertures 328d change their openings, and the position of the aperture which is fully open is shifted one to the next upwards and then downwards so that the flow rate distribution is altered successively from one format to another in the cutting zone. The successive changes in the flow rate distribution are repetitively swept over the vertical length of the cutting slot 4a. As a consequence, a highly dynamic flushing condition, yet equalized over the entire length of the cutting front 4c is created which assures a uniform and enhanced erosive stock removal of the workpiece 4.

Figure 15:
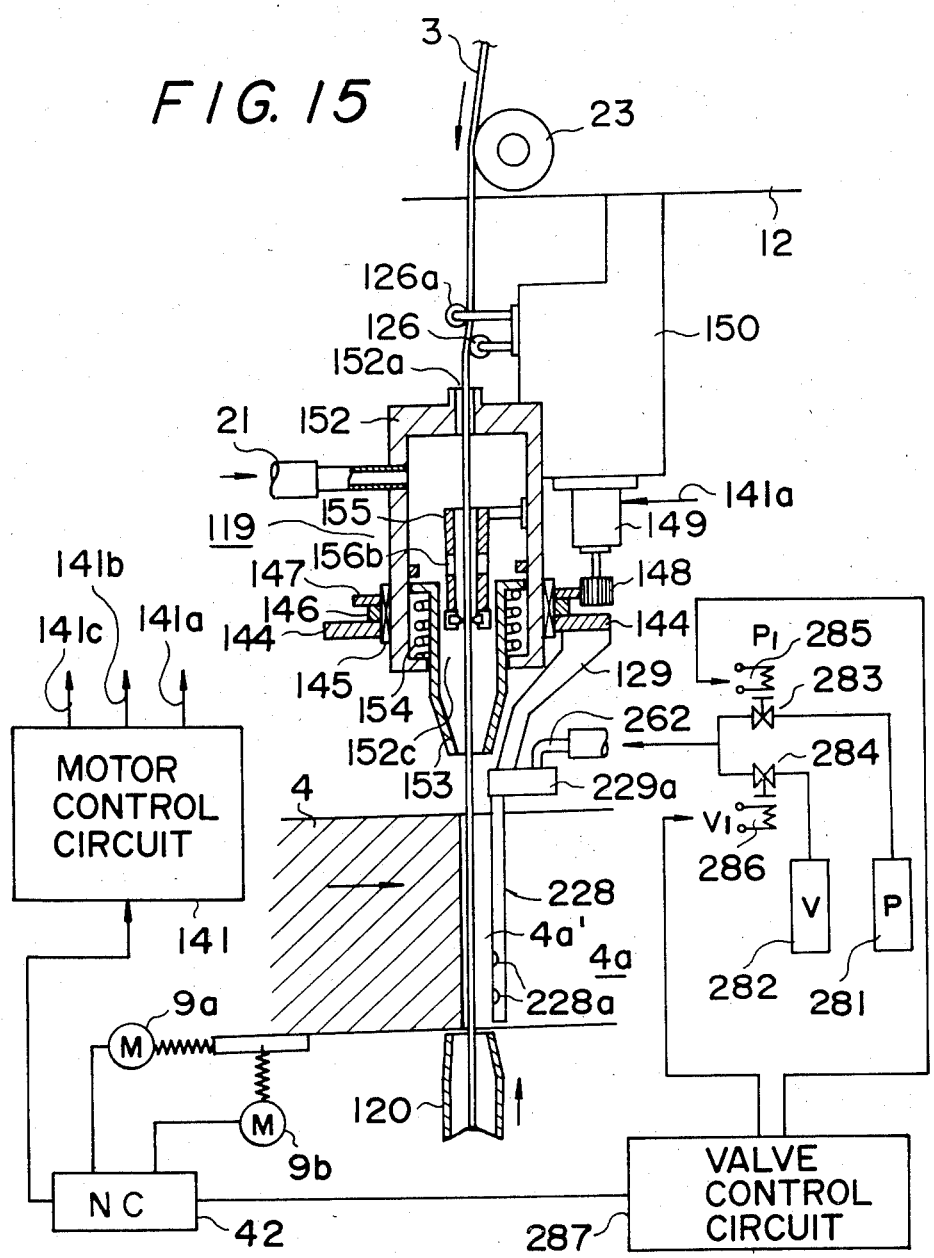
FIG. 15 is a diagrammatic view illustrating a further modified from embodying the principles of the present invention.

FIG. 15 shows an TW-EDM system having upper and lower nozzle assemblies 119 and 120 as previously described for discharging the cutting liquid medium into the cutting zone formed in the workpiece 4. To mechanically dam and also to more positively regulate the flow of the cutting liquid medium in the cutting zone a perforated tubular element 228 as previously described is inserted in the cutting slot 4a immediately behind the electrode wire 3 and in parallel thereto across the space 4a'. The tubular element 228 has its lower end set free and its upper end carried by the support member 129 which is rotatable by means of the motor 149 to adequately maintain the angular position of the tubular element 228 about the electrode wire 3 as previously described. Here again, the element 228 is movable vertically (FIGS. 8 and 13), and also laterally as previously described.

The tubular member 228 is here designed to serve alternatively as an auxiliary fluid delivery nozzle or a suction nozzle, or as both. Accordingly, a fluid conduit 262 communicating through the coupling 229a with the member 228 (FIG. 13) is shown as connected to a source 281 of pressurized cutting liquid medium and a suction source 282 via valves 283 and 284, respectively. The valves 283 and 284, have of electromagnetic type, have their respective operating coils 285 and 286 which are energized by a valve control circuit 287. Thus, when the coil 285 is energized to open to valve 283, the pressurized liquid medium is delivered from the source 281 and discharged through one or more apertures 282a of the tubular member 283 into the space 4a' to regulate the flushing liquid medium discharged from the main nozzles 119 and 120 therein. When the coil 286 is energized, the valve 284 is opened to connect the tubular member 228 to the suction source 282. A negative pressure is thus created in the tubular member 228 to establish in the space a steady flow of the liquid medium which is sucked into the tubular member 228 through the apertures 228a and drawn towards the suction source 282. For repeating a cycle of the liquid delivery and suction through the tubular member 228, the control circuit 287 may be a flip-flop or free-running oscillator providing electrical signals which alternately energize the coils 285 and 286. Also, the control circuit 287 may operate in conjunction with the NC unit 42. For example, while the wire 3 is moving along a straight-line or gentle-curve cutting path, the control circuit 287 may energize the coil 284 to maintain a suction mode. When the wire is changing this course, the control circuit 287 responds to the NC unit 42 to switch the suction mode into a delivery mode. In this manner, the flushing condition in the cutting zone will be highly optimized.

What is claimed is:

1. In a method of electroerosively cutting an electrically conductive workpiece with a continuous wire electrode wherein the wire electrode is axially transported continuously to traverse the workpiece while defining a cutting zone therewith flushed with a liquid medium and an electric machining current is passed between the traveling wire electrode and the workpiece through the flushing liquid medium to electroerosively remove material from the workpiece across said cutting zone while the traveling wire electrode and the workpiece are relatively displaced transversely to the wire electrode along a prescribed cutting path, thereby progressively forming a cutting slot behind the advancing wire electrode along said path in the workpiece to produce therein a contour defined by said slot, the improvement which comprises regulating the flushing liquid medium in the cutting zone by introducing an elongate element into said slot, positioning said elongate element in said slot immediately behind said wire electrode, and maintaining said elongate element immediately behind said wire electrode advancing in said slot substantially parallel to said wire electrode during a course of the relative displacement of said wire electrode and said workpiece along said path so that the element moves along the slot with the wire electrode, said element controlling the flow of said medium in said zone.

2. The improvement defined in claim 1, further comprising maintaining said elongate element in electrically insulating relationship with said wire electrode.

3. The improvement defined in claim 1 or claim 2 wherein said elongate element is maintained substantially in parallel with said wire electrode across a spacing being in a range of two to five times as great as the thickness of said wire electrode.

4. The improvement defined in claim 3, further comprising sensing a change in the course of said wire electrode along said path to produce a signal representing said change and, in response to said signal controlling the angular position of said elongate element about an axis of travel of said wire electrode through said workpiece so that the elongate element moves effectively behind the wire electrode along said path in said cutting slot.

5. The improvement defined in claim 3, further comprising displacing said elongate element substantially longitudinally substantially in parallel with said wire electrode in said cutting slot during a course of said relative displacement.

6. The improvement defined in claim 3, further comprising temporarily retracting said elongate element substantially from said cutting slot during a course of said relative displacement.

7. The improvement defined in claim 3, further comprising axially reciprocating said elongate element in said cutting slot during a course of said relative displacement.

8. The improvement defined in claim 3, further comprising imparting a lateral oscillation to said elongate element during a course of said relative displacement.

9. The improvement defined in claim 1 wherein said elongate element is tubular and formed with at least one aperture in a portion of the lateral wall thereof juxtaposed with said wire electrode in said cutting slot.

10. The improvement defined in claim 9 wherein said at least one aperture comprises an aperture elongated longitudinally of said elongate element.

11. The improvement defined in claim 9 wherein said at least one aperture comprises an array of apertures arranged longitudinally of said elongate element.

12. The improvement defined in claim 9, further comprising supplying into said tubulr elongate element the liquid medium under pressure from an external source thereof to discharge said liquid medium into said cutting slot through said at least one aperture.

13. The improvement defined in claim 9, further comprising producing a negative pressure in said tubular elongate element to suck therein the liquid medium flushing in said cutting slot.

14. The improvement defined in claim 9, claim 10, claim 11, claim 12 or claim 13, further comprising maintaining said tubular elongate element in electrically insulating relationship with said wire electrode.

15. The improvement defined in claim 14 wherein said tubular elongate element is maintained substantially in parallel with said wire electrode across a spacing being in a range of two to five times as great as the thickness of said wire electrode.

16. The improvement defined in claim 14, further comprising sensing a change in the course of said wire electrode along said path to produce a signal representing said change and, in response to said signal, controlling the angular position of said tubular elongate element about an axis of travel of said wire electrode through said workpiece so that the tubular elongate element effectively moves behind the wire electrode along said path in said cutting slot.

17. The improvement defined in claim 14, further comprising displacing said tubular elongate element substantially longitudinally substantially in parallel with said wire electrode in said cutting slot during a course of said relative displacement.

18. The improvement defined in claim 14, further comprising temporarily withdrawing said tubular elongate element substantially from said cutting slot during a course of said relative displacement.

19. The improvement defined in claim 14, further comprising axially reciprocating said tubular elongate element in said cutting slot during a course of said relative displacement.

20. The improvement defined in claim 14, further comprising imparting a lateral oscillation of said tubular elongate element during a course of said relative displacement.

21. In an apparatus for electroerosively cutting an electrically conductive workpiece with a continuous wire electrode, having means for axially transporting the wire electrode continuously through the workpiece while defining a cutting zone therewith flushed with a liquid medium, power supply means for electrically energizing said traveling wire electrode and said workpiece to electroerosively remove material from the workpiece across the liquid flushed cutting zone and cutting feed means for relatively displacing the workpiece and the traveling wire electrode transversely to the latter along a prescribed cutting path, thereby progressively forming a cutting slot behind the wire electrode advancing along said path in the workpiece to produce therein a contour defined by said cutting slot, the improvement which comprises:

an elongate element in said cutting slot; and
means for positioning said elongate element in said slot immediately behind said wire electrode advancing in said slot and substantially in parallel with said advancing wire electrode during a course of the relative displacement of said wire electrode and said workpiece along said path whereby said elongate element controls flow of said liquid in said zone.

22. The improvement defined in claim 21 wherein said elongate element is composed, at least along a lateral surface thereof, of an electrically insulating material.

23. The improvement defined in claim 21 wherein said maintaining means is adapted to maintain said elongate element substantially in parallel with said wire electrode across a spacing being in a range of two to five times as great as the thickness of said wire electrode.

24. The improvement defined in claim 23, further comprising means for variably adjusting the spacing between said elongate element and said wire electrode.

25. The improvement defined in claim 21, claim 22, claim 23 or claim 24 wherein sid maintaining means comprises means for sensing a change in the course of said wire electrode along said path and means responsive to said sensing means for controlling the angular position of said elongate element about an axis of travel of said wire electrode through said workpiece so that the elongate element effectively moves behind the wire electrode along said path in said cutting slot.

26. The improvement defined in claim 25, further comprising means for displacing said elongate element substantially longitudinally substantially in parallel with said wire electrode in said cutting slot during a course of said relative displacement.

27. The improvement defined in claim 25, further comprising means for temporarily retracting said elongate element substantially from said cutting slot during a course of said relative displacement.

28. The improvement defined in claim 25, further comprising means for axially reciprocating said elongate element in said cutting slot during a course of said relative displacement.

29. The improvement defined in claim 25, further comprising means for imparting a lateral oscillation to said elongate element during a course of said relative displacement.

30. The improvement defined in claim 21 wherein said elongate element is tubular and formed with at least one aperture in a portion of the lateral wall thereof juxtaposed with said wire electrode in said cutting slot.

31. The improvement defined in claim 30 wherein said at least one aperture comprises an aperture elongate longitudinally of said elongate element.

32. The improvement defined in claim 30 wherein said at least one aperture comprises an array of apertures arranged spaced apart longitudinally of said elongate element.

33. The improvement defined in claim 30, further comprising means for variable adjusting the distance between said elongate element and said wire electrode in said cutting slot.

34. The improvement defined in claim 30, further comprising means for supplying into said tubular elongate element the liquid medium under pressure from an external source thereof to discharge said liquid medium into said cutting slot through said at least one aperture.

35. The improvement defined in claim 30 wherein said tubular elongate element is composed, at least along a lateral surface thereof, of an electrically insulating material.

36. The improvement defined in claim 30, further comprising means for sensing a change in the course of said wire electrode along said path and means responsive to said sensing means for controlling the angular position of said tubular elongate element about an axis of travel of said wire electrode through said workpiece so that the tubular elongate element effectively moves behind the wire electrode along said path in said cutting slot.

37. The improvement defined in claim 30, further comprising means for displacing said tubular element substantially longitudinally substantially in parallel with said wire electrode in said cutting slot during a course of said relative displacement.

38. The improvement defined in claim 30, further comprising temporarily withdrawing said tubular elongate element substantially from said cutting slot during a course of said relative displacement.

39. The improvement defined in claim 30, further comprising means for axially reciprocating said tubular element in said cutting zone during a course of said relative displacement.

40. The improvement defined in claim 30, further comprising means for laterally vibrating said tubular elongate element in said cutting slot during a course of said relative displacement.

* * * * *